Nov. 14, 1933.　　　　F. ACKERMAN　　　　1,935,307
PORTABLE LUNCHEON KIT
Filed Dec. 17, 1928　　　3 Sheets-Sheet 1

Inventor
Frank Ackerman
By James F. Splain
Attorney

Nov. 14, 1933.  F. ACKERMAN  1,935,307
PORTABLE LUNCHEON KIT
Filed Dec. 17, 1928  3 Sheets-Sheet 2
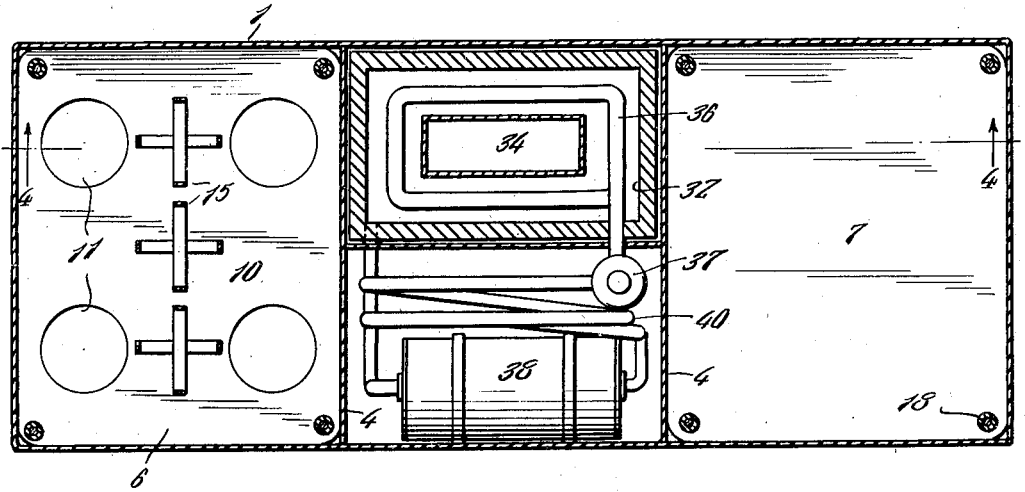
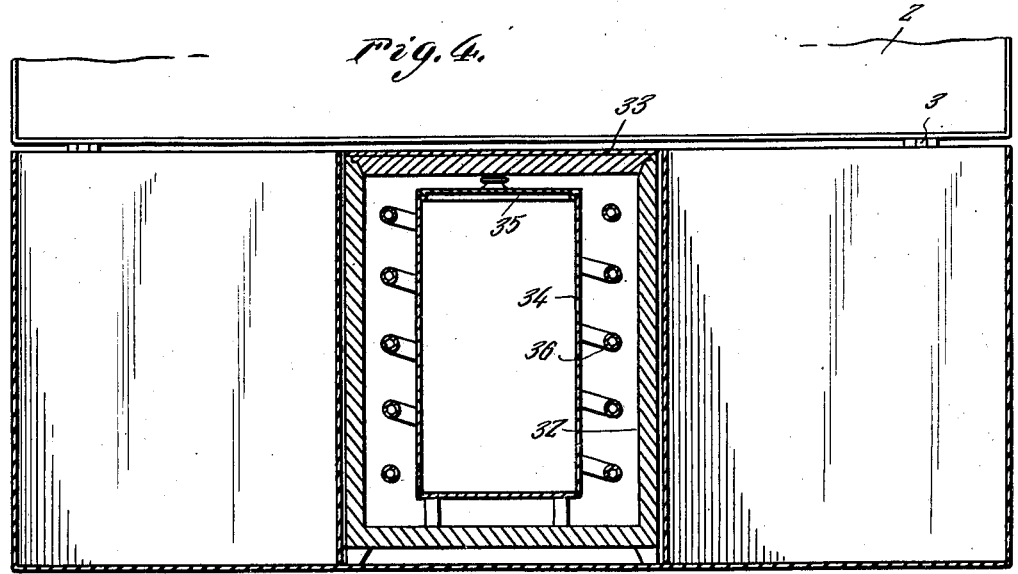
Inventor
Frank Ackerman
By James F. Splain
Attorney

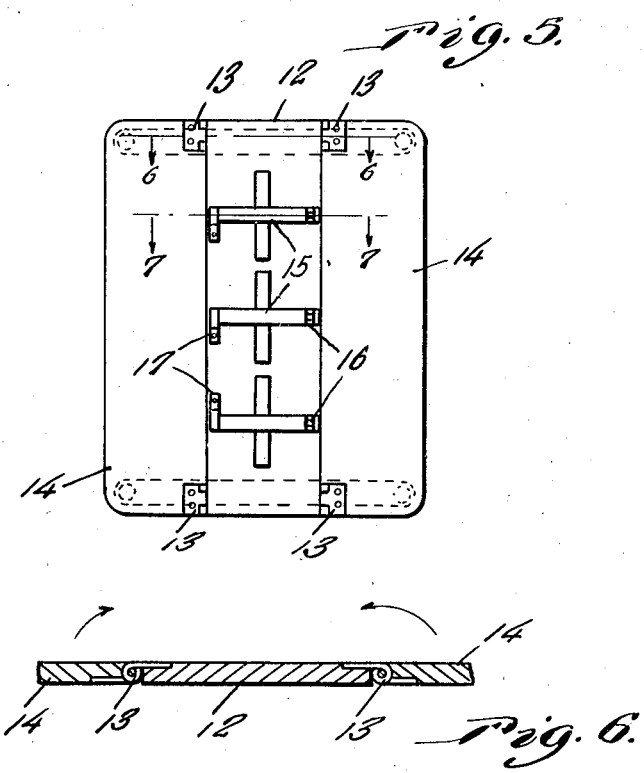

Patented Nov. 14, 1933

1,935,307

UNITED STATES PATENT OFFICE 1,935,307

PORTABLE LUNCHEON KIT

Frank Ackerman, Passaic, N. J.

Application December 17, 1928
Serial No. 326,606

2 Claims. (Cl. 206—4)

The object of my said invention is the provision of a portable luncheon kit, preferably of refrigerating capacity, and adapted to be used to advantage in motor buses, airships, motor vehicles and various other carriers.

To the attainment of the foregoing the invention consists in the improvement as hereinafter described and definitely claimed.

In the accompanying drawings, forming part of this specification:

Figure 3 is a horizontal section on the line 3—3 of Figure 1.

Figure 4 is a vertical section on line 4—4 of Figure 3.

Figure 5 is a bottom plan view of the top section of the removable frame removed from the left hand compartment.

Figure 6 is an enlarged fragmentary section taken substantially on line 6—6 of Figure 5.

Figure 7 is an enlarged fragmentary section on line 7—7 of Figure 5.

Similar numerals designate corresponding parts in all of the views of the drawings.

Figure 1:
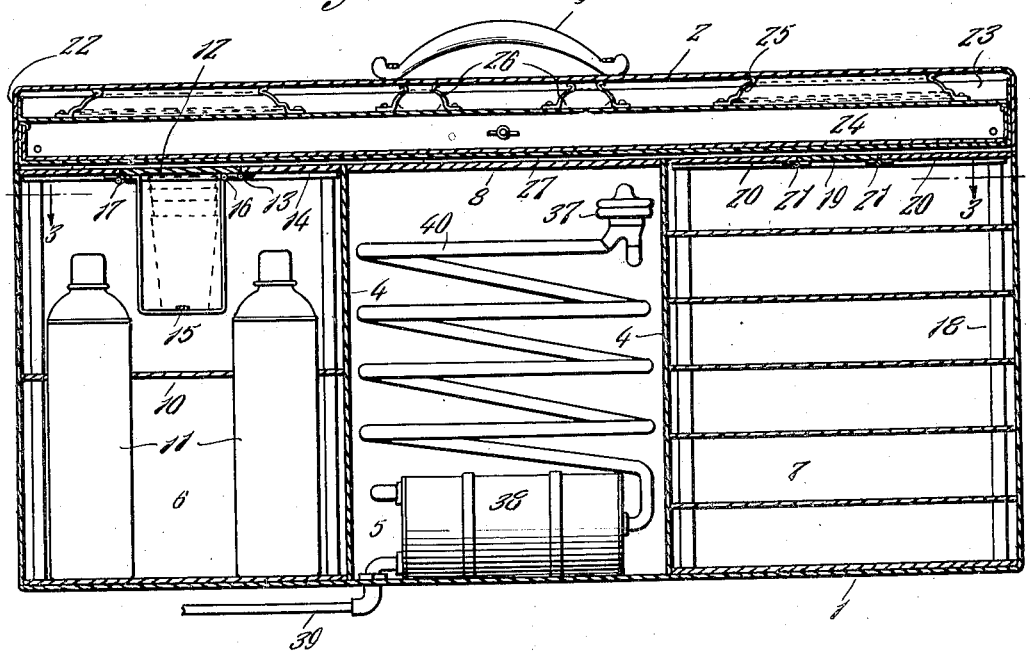
Figure 1 is a view, partly in longitudinal vertical section and partly in elevation of the preferred embodiment of my invention.

The casing body 1 is equipped with a flanged lid 2, hinged at 3 and designed to be detachably secured in closed position by fasteners, not shown.

Said casing body 1 is divided by upright partition walls 4 into a central compartment 5 and end compartments 6 and 7. The compartment 5 has a top wall 8 preferably removable to afford access to the interior of said compartment when necessary.

On the lid 2 is a handle 9 through which the kit may be conveniently carried when desired.

In the compartment 6 is a removable frame 10 adapted to carry removable bottles 11, Figures 1 and 3, and provided with a top section 12 to which are hinged at 13 leaves 14. At its underside the top section 78 is provided with three (more or less) holders 15 for nested glasses, Figures 1 and 3, said holders 15 being hinged at 16 and detachably fastened at 17 so that when one of the leaves 14 is raised glasses may be readily placed in and removed from the holders.

A removable frame 18 is disposed in the compartment 7, said frame 18 having uprights and shelves, Figure 1, and also having a top section 19 and top leaves 20, hinged at 21 to the section 19 so as to afford access to the space above the uppermost shelf. A continuous cover means is afforded for the casing body by the top wall 8, the top section 12, and the top section 19, all of which are in horizontal alinement near the upper edges of the casing body. When the kit is closed this cover means forms a support for the tray and table to be presently described. Manifestly various articles and provisions may be carried on the shelves of the frame 18.

Figure 2:
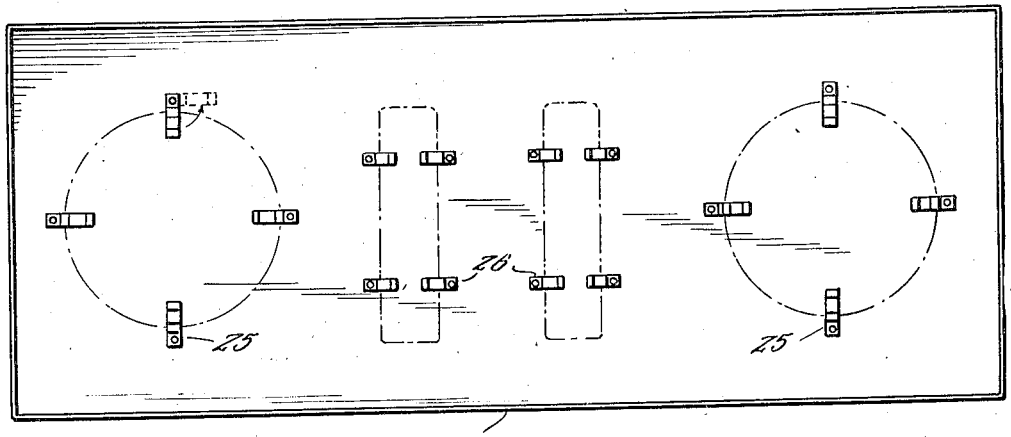
Figure 2 shows in plan the tray of the device as removed from the casing body.

The flange 22 of the lid 2 is quite deep, Figure 1, and under said lid are designed to be carried the removable tray 23, Figures 1 and 2, and the removable table 24, Figures 1 and 5-7.

The tray 23 is flanged as illustrated and is equipped with pivoted resilient clips 25 for holding plates, and with similar clips 26 for holding bundles of knives, forks and spoons. The flange on the tray provides a wide bearing for sliding engagement with the lid flange 22.

I have especially designed a collapsible table 24 to be carried by and removably arranged in the space in lid 2 between the bottom of tray 23 and the free edge of lid flange 22.

For the preservation in a wholesome state of food in the compartment 7 and drink in the compartment 6, I provide in the intermediate compartment 5, the illustrated refrigerating equipment which is designed to be operated by suction of the internal combustion engine of a motor vehicle or airship, or by a belt-driven motor on a railway car. I also provide in the compartment 5 a brine tank with a removable lid 33; a receptacle 34 in chamber 32 and provided with a removable cover 35, and a pipe coil 36 in the tank 32 and about the receptacle 34, Figures 3 and 4. The ends of the coil 36 are disposed outside of the brine tank 32. One of the said ends is connected to an expansion valve 37, Figures 1 and 3, and the other end is connected to a compressor combined with a small suction motor similar to the device which operates a windshield cleaner on an automobile and operable by the suction of the several cylinders in the internal combustion engine of a motor vehicle. The said compressor and motor are disposed in a subcasing 38 in compartment 5, and the motor is connected with said engine cylinders through a pipe 39, Figure 1. In some cases as in a railway car the compressor or pump may be driven from one of the car axles through a belt.

The compressor, in turn, is connected to a worm or coil of pipe 40 which leads to the beforementioned expansion valve 37.

Any appropriate refrigerating agent may be employed in the coils 36 and 40 and the compressor alluded to, said agent being forced by the compressor through coil 40 to the expansion valve 37 where it expands and enters the coil 36. In said coil 36 the gaseous refrigerating agent is liquefied in well-known manner and for the purpose well known in the art and is returned in liquid state to the compressor, completing the cycle of operation.

Manifestly with the means described the compartments 5, 6 and 7 will be maintained in a cool state; and I would also have it understood that when the compartment 5 has been cooled to the extent desired a thermostat control (not shown because well known in the art) shuts off the compressor and prevents operation thereof until the air in compartment 5 is raised in temperature to a predetermined degree.

I have specifically described the preferred embodiment of my invention in order to impart an exact understanding of said embodiment. I do not desire, however, to be limited to the specific construction disclosed, my invention being defined by my appended claims within the scope of which modifications may be made without departure from my invention.

Having described my invention, what I claim and desire to secure by Letters Patent, is:

1. A luncheon kit comprising a casing body, a lid hingedly connected to the casing body and having a relatively wide flange, a tray mounted within the lid and occupying a portion of the space therein, said tray further provided with a marginal flange for sliding engagement with the lid flange, vertical partitions in the casing dividing the interior thereof into compartments, covers for the compartments supported in the casing adjacent the upper edges thereof, said covers being in horizontal alinement to furnish support for the tray and other articles carried in the unoccupied space in the lid, certain of said covers having swingable sections therein to gain access to the interior of said compartments without removing said covers, and article carrying trays in certain of said compartments.

2. A luncheon kit comprising a casing body, a lid hingedly connected to the casing body and having a relatively wide flange, a tray mounted within the lid and occupying a portion of the space therein, said tray further provided with a marginal flange for sliding engagement with the lid flange, vertical partitions in the casing dividing the interior thereof into compartments, covers for the compartments supported in the casing adjacent the upper edges thereof, said covers being in horizontal alinement to furnish support for the tray and other articles carried in the unoccupied space in the lid, certain of said covers having swingable sections therein to gain access to the interior of said compartments without removing said covers, and article carrying trays in certain of said compartments, and a cup carrying frame mounted on the under side of one of said cover sections.

FRANK ACKERMAN.